Inventor
John M. Straub.
By Robert M. Pierson
Atty.

Patented Jan. 27, 1925.

1,524,462

UNITED STATES PATENT OFFICE.

JOHN M. STRAUB, OF AKRON, OHIO, ASSIGNOR TO THE B. F. GOODRICH COMPANY, OF NEW YORK, N. Y., A CORPORATION OF NEW YORK.

APPARATUS FOR BUILDING HOLLOW CUSHION TIRES.

Application filed December 9, 1922. Serial No. 605,800.

*To all whom it may concern:*

Be it known that I, JOHN M. STRAUB, a citizen of the United States, residing at Akron, in the county of Summit and State of Ohio, have invented a certain new and useful Apparatus for Building Hollow Cushion Tires, of which the following is a specification.

This invention relates to apparatus for building hollow cushion tires and particularly to means for supporting a series of core members or arcuate core sections in association with a tire base so that the tire body may be built upon the tire base and core sections and the latter subsequently withdrawn through the base to leave a cavity or cavities in the tire body.

Its general object is to provide improved means for so holding the core members in association with the tire base as to avoid displacement of the core members during the building of the tire-body thereon. A further object is to provide, with suitable core member, holding means therefor which may readily be removed after the tire-body is built and before vulcanization thereof, so that the built up tire and the core members therein constitute a structure having a substantially cylindrical inner periphery, permitting the vulcanization of the tire in molds of such types as are commonly used for solid tires.

Figure 1:
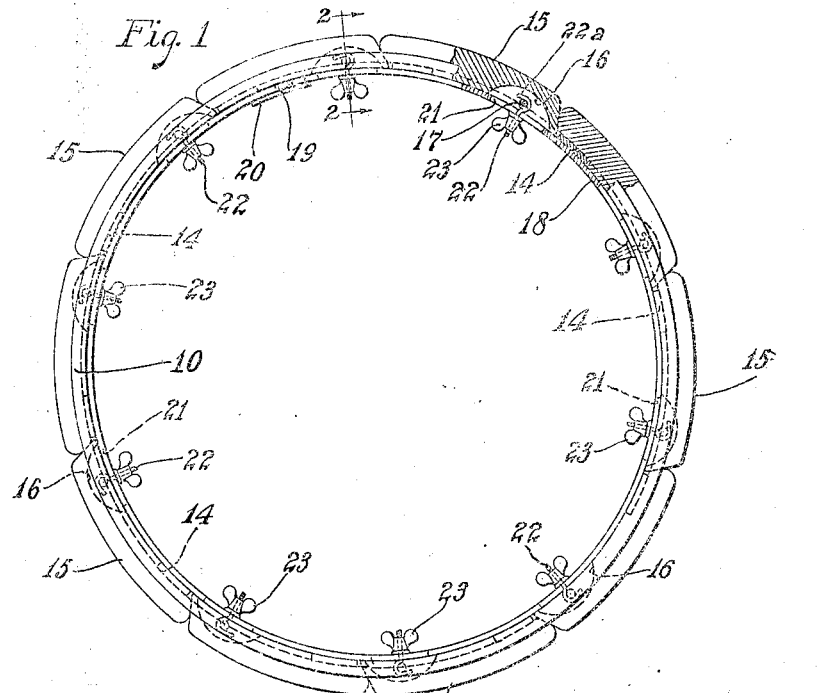
Fig. 1 is a side elevation of a tire base, cavity-forming core sections, and holding means therefor, embodying a preferred form of my invention.
Figure 3:
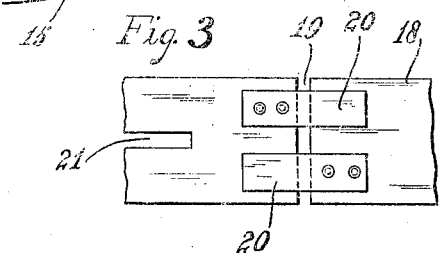
Fig. 3 is a plan view of the free end portions of the core-holding device.
Figure 2:
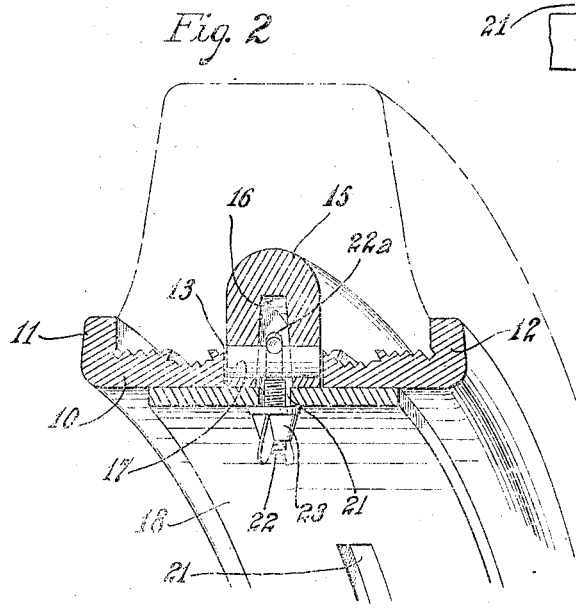
Fig. 2 is a sectional perspective view, sectioned on line 2—2 of Fig. 1.

Referring to the drawings, 10 is an annular metal rim or tire base, of generally cylindrical form, divided into two annular side portions or members, 11, 12, by a circumferentially aligned series of longitudinal slots, one of said slots being shown at 13 in Fig. 2. The slots 13 alternate with narrow cross-webs or bridges 14, 14 which connect the side members 11, 12 and act as spacing means therefor, and preferably are integral therewith.

Assembled with the tire base is a sectional core comprising arcuate sections 15, 15 adapted to be mounted end to end in the slots 13, one end of each section being cut away so as to overlap one of the bridges 14 while throughout the rest of its length its inner face is substantially flush with that of the tire-base 10. Near the other end of each core section is a cavity 16 recessed from the inner periphery thereof, said cavity being traversed by a cross-pin 17.

Seating against the inner periphery of the tire base 10 is a contractible metal ring 18, transversely split as shown at 19, each of its ends, at the split, having secured thereto a short bridge-plate 20 spanning the split 19 to prevent relative radial displacement of said ends although permitting the ring to be contracted for insertion in the tire base. Along the median line of the ring is a circumferential series of short slots, 21, 21 of such number and spacing as to be registerable with the cavities 16 of the core sections 15. The inner face of each core section 15 rests against the ring 18 and the core section is securely fastened thereto by a bolt 22 having a hooked end 22ª engaging the pin 17, said bolt extending from said core section through one of the slots 21 of the ring 18, and being provided at its opposite end with a clamping nut 23.

The bolts 22 securely hold the core sections against the ring 18, lateral movement of the core sections is prevented by the sides of the slots 13, and circumferential creeping of said sections is prevented by the bridges 14. With the base and core thus assembled, a tire-body may be built thereon by progressive application of unvulcanized rubber strips, and any excess stock trimmed therefrom, as in common practice, the structure being suitably supported, as by a spider, and rotated.

The tire-body being thus formed the nuts 23 and bolts 22 are removed and the ring 18 contracted and withdrawn from the tire base. The tire is then vulcanized in a mold under heat and pressure in the usual manner, and after vulcanization the core sections 15 are removed from the tire by withdrawing them through the slots 13 in the tire base.

Modifications may be resorted to without departing from the scope of my invention, and I do not wholly limit my claims to the exact embodiment shown.

I claim:

1. Apparatus for building a cushion tire, said apparatus comprising a tire-base structure adapted to become a part of the finished tire and including a pair of annular, spaced apart side-portions, a set of core-members mounted between said side-portions and projecting from the outer periphery thereof, core-retaining means abutting an inner face of said tire-base structure, and means for detachably securing said core-members to said core-retaining means.

2. Apparatus for building a cushion tire, said apparatus comprising a tire-base structure adapted to become a part of the finished tire and including a pair of annular, spaced apart side-portions, a set of core-members mounted between said side-portions, projecting from the outer periphery thereof and constituting a substantially annular core, a transversely split ring fitting within said tire-base structure, and formed with apertures, and bolts in said apertures adapted to secure said core members to said ring.

3. Apparatus for building a cushion tire, said apparatus comprising a tire-base formed with radially disposed apertures, a set of core members respectively mounted in said apertures and projecting from the outer periphery of said tire-base and having inner faces substantially flush with an inner face of the tire-base, a substantially annular member fitting within the tire-base, and bolts securing said core members to said substantially annular member.

4. Apparatus for building a cushion tire, said apparatus comprising a tire-base formed with a series of longitudinal slots separated by cross-bridges, a set of core members mounted in said slots, projecting from the outer periphery of the tire base and overlapping said cross-bridges so as to constitute a substantially complete annular core, a transversely split ring fitting within said tire-base, and means for clamping said core members to said ring.

In witness whereof I have hereunto set my hand this 1st day of December, 1922.

JOHN M. STRAUB.